E. H. BINGHAM.
ANTISKID TREAD.
APPLICATION FILED AUG. 2, 1915.
1,188,034.
Patented June 20, 1916.
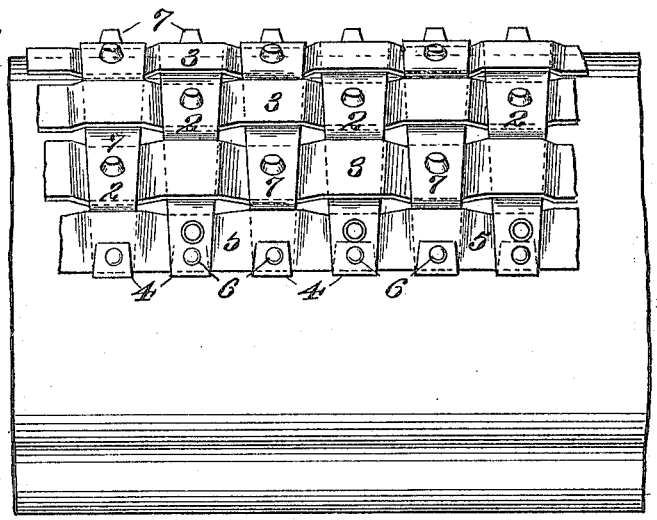
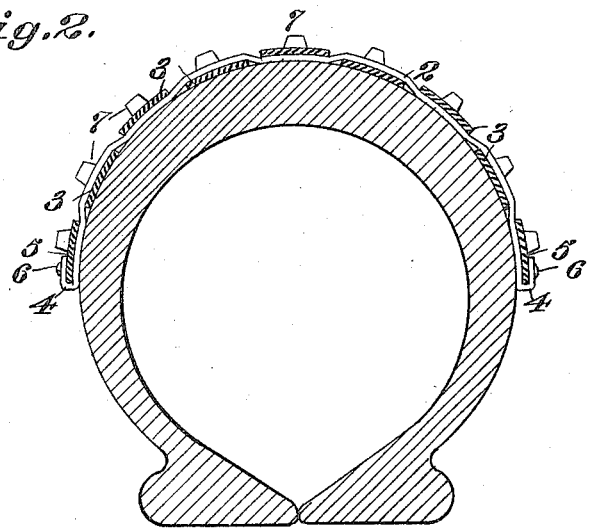
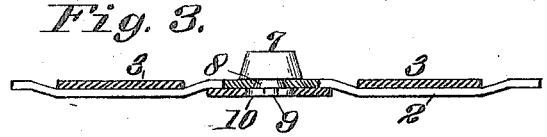
WITNESSES:
J. H. Herring
Charles Pickles
INVENTOR
Eugene H. Bingham
BY Strong & Townsend
ATTORNEYS

UNITED STATES PATENT OFFICE.

EUGENE H. BINGHAM, OF SAN FRANCISCO, CALIFORNIA.

ANTISKID-TREAD.

1,188,034.

Specification of Letters Patent.

Patented June 20, 1916.

Application filed August 2, 1915. Serial No. 43,069.

*To all whom it may concern:*

Be it known that I, EUGENE H. BINGHAM, a citizen of the United States, residing in the city and county of San Francisco and State of California, have invented new and useful Improvements in Antiskid-Treads, of which the following is a specification.

This invention relates to an anti-skid tread and tire armor for pneumatic vehicle tires.

One of the objects of the present invention is to provide a flexible metal tread, constructed of comparatively thin strips of spring steel interwoven basket fashion, which, when applied to a pneumatic vehicle tire, will form an anti-skid covering and armor practically puncture-proof and indestructible.

Further objects will hereinafter appear.

The invention consists of the parts and the construction and combination of parts as hereinafter more fully described and claimed, having reference to the accompanying drawings, in which—

Figure 1 is a side view of a portion of the anti-skid tread. Fig. 2 is a cross section of a pneumatic tire, showing the application of the invention. Fig. 3 is an enlarged cross section, showing the manner in which the anti-skid studs are secured.

Referring in detail to the drawings, it will be seen that the tire armor or anti-skid tread here shown consists of interwoven strips of thin spring metal or bands, such as indicated at 2 and 3, woven in a comparatively close mesh similar to a basket weave. The strips 2, composing the warp, extend crosswise of the tire to which the tread is applied and terminate in hooks 4 which embrace strips 5, being preferably secured thereto by rivets 6 or like means. The woof strands or strips 3 extend circumferentially of the wheel and are interwoven with the bands 2 basket-fashion, so that the bands 2 and 3 present a comparatively closely woven metal fabric structure which covers the tread portion of the tire; the fabric covering being extended down a sufficient distance on the sides of the tire to protect the casing and inflatable tube.

For the purpose of giving wearing strength and traction, and also to prevent skidding or side slipping, a plurality of projecting studs, such as indicated at 7, has been provided. These studs are secured in the strips 2 where they pass over the adjacent underlying, crosswise extending strips, as shown in the enlarged section of Fig. 3, being riveted therein, as at 8.

To prevent slippage of the cross strips 2, 6 with relation to the circumferential strips 3, inwardly projecting pins, such as indicated at 9, are provided on the studs 7. The inwardly projecting pins pass through perforations 10 formed in the crosswise extending strips 2, said perforations being comparatively larger than the pins 9. A sufficient amount of play between the two strips is thus secured and still a connection is provided which prevents slippage of one strip with relation to the other. At the same time perfect flexibility or yielding movement of one strip with relation to the other is secured, this being impossible if the strips were securely riveted together.

In practice, the strips 2 and 3 are about ½ an inch wide, more or less, and are sufficiently thin to have the desired degree of resiliency. In actual construction, by referring to Fig. 1, it will be seen that the crosswise extending strips 2 are provided with more bearing surface at the top of the tire than near the lower ends; this being secured by cutting the strips on a radial line from the axis of the wheel. More wearing surface and strength is thus produced at the point of contact.

A woven spring metal fabric of this sort having inherent within it the power of recovering its shape when pressure is released on it, and constructed and operated as herein described, constitutes the substitute of the usual expensive, puncturable casings now generally employed. The tread section here shown not only provides an armor for the tire which is practically puncture-proof, but it also forms an anti-skid surface and wearing surface which protects the outer casing from the usual wear to which it is generally subjected. Chains or other anti-skid means now employed may be entirely eliminated. The fabric covering here shown also serves to reinforce the tire, thus preventing blowouts to a large extent. Being constructed of thin metal strips interwoven as described, it becomes light and indestructible in construction and conforms itself to practically any shaped tire to which it may be applied. It is secured on the tire by merely inflating same. The tire, when being inflated, expands to such a degree as to thoroughly grip the metal fabric cover or tread here shown, thus eliminating any other securing means.

Having thus described my invention, what I claim and desire to secure by Letters Patent is—

In a tire covering formed of woven transverse and longitudinal strips, studs securing the strips together at their points of intersection, a portion of the shank of each stud being rigidly secured to the respective transverse strips, one end of each stud terminating in a substantially small pin, each of the longitudinal strips having elongated openings, said pins being positioned in the openings, for connecting the strips together, to allow movement of one strip with relation to the other, and the ends of said pins lying in a plane flush with the tire engaging surface of the covering.

In testimony whereof I have hereunto set my hand in the presence of two subscribing witnesses.

EUGENE H. BINGHAM.

Witnesses:
M. A. BINGHAM,
A. W. McNULTY.

Copies of this patent may be obtained for five cents each, by addressing the "Commissioner of Patents. Washington, D. C."